United States Patent [19]

Alfio

[11] 4,173,444
[45] Nov. 6, 1979

[54] EQUIPMENT FOR PRODUCING CONTINUOUS TAPES OF RUBBERY VULCANIZABLE MATERIAL, FOR THE MANUFACTURE OF HOSE ARTICLES

[75] Inventor: Deregibus Alfio, Padua, Italy

[73] Assignee: The Goodyear Tire & Rubber Company, Akron, Ohio

[21] Appl. No.: 841,790

[22] Filed: Oct. 13, 1977

[30] Foreign Application Priority Data

Apr. 5, 1977 [IT] Italy .............................. 23157 A/77

[51] Int. Cl.² .............................................. B29C 15/00
[52] U.S. Cl. .......................... 425/363; 425/DIG. 235; 165/89; 165/90
[58] Field of Search ............. 425/224, 363, DIG. 235; 29/110, 115; 432/82, 83; 72/201; 165/89, 90

[56] References Cited

U.S. PATENT DOCUMENTS

| | | | |
|---|---|---|---|
| 1,332,435 | 3/1920 | Vito | 425/363 X |
| 1,651,502 | 12/1927 | Banbury | 165/90 X |
| 2,231,057 | 2/1941 | Dieterich | 425/363 X |
| 2,826,005 | 3/1958 | Wynne | 425/DIG. 235 |
| 2,998,327 | 8/1961 | Calallo | 165/89 X |
| 3,007,207 | 11/1961 | Salhofer | 425/363 X |
| 3,023,695 | 3/1962 | Kuster | 425/DIG. 235 |
| 3,116,787 | 1/1964 | Campbell | 425/DIG. 235 |
| 3,182,587 | 5/1965 | Woodhall | 425/DIG. 235 |
| 3,583,687 | 6/1971 | Minoo et al. | 165/89 |
| 3,857,664 | 12/1974 | Johnson et al. | 425/DIG. 235 |

Primary Examiner—Robert L. Spicer, Jr.
Attorney, Agent, or Firm—R. S. Washburn

[57] ABSTRACT

An equipment for continuously producing tapes in rubbery vulcanizable material, adapted to the manufacture of hoses, the equipment comprising at least one pair of calendering rollers, means for causing a rubbery composition to pass and be calendered into a tape between said rollers, and a set of internally cooled hollow cylinders and guide means for guiding the tape in surface engagement with said cooled cylinders.

3 Claims, 4 Drawing Figures

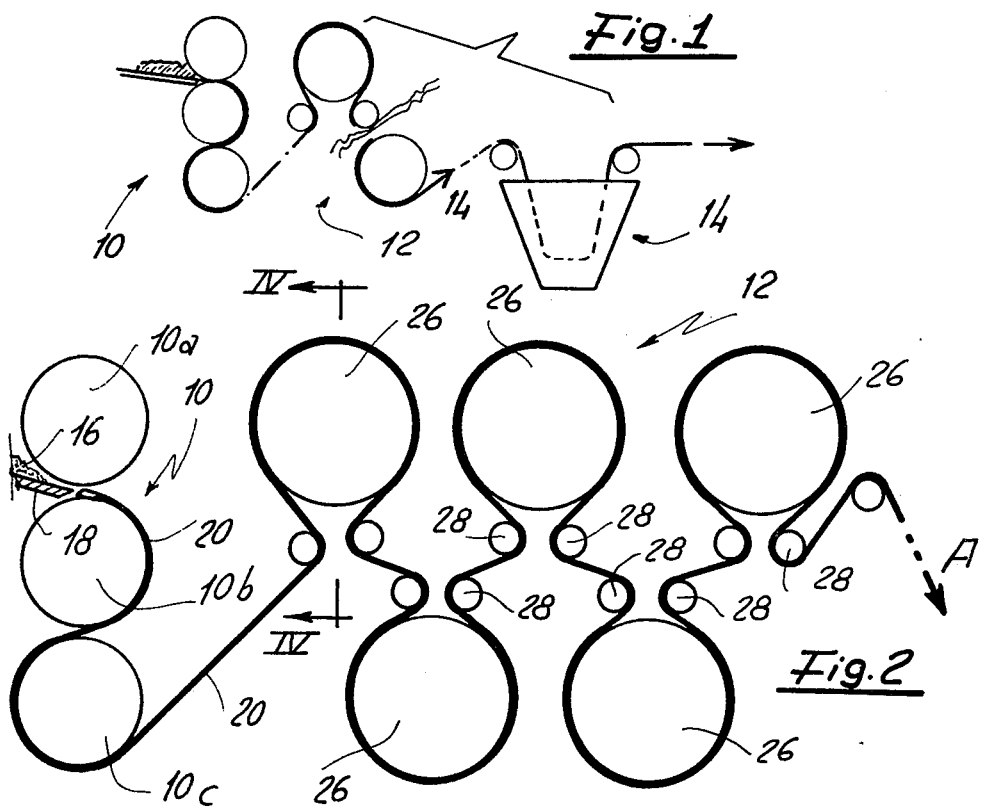
Fig. 1
Fig. 2
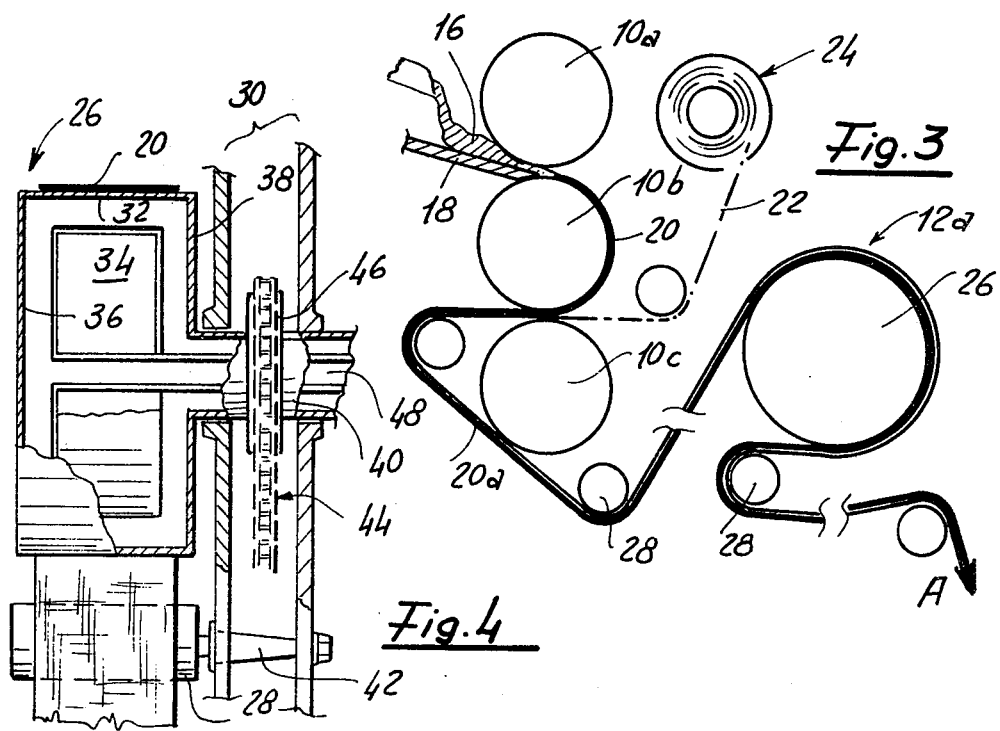
Fig. 3
Fig. 4

4,173,444

EQUIPMENT FOR PRODUCING CONTINUOUS TAPES OF RUBBERY VULCANIZABLE MATERIAL, FOR THE MANUFACTURE OF HOSE ARTICLES

BACKGROUND OF THE INVENTION

1. Field of the Invention

This invention concerns equipment for the industrial production of tapes, in particular for the formation or manufacture of hose, in natural or synthetic rubber, which can be vulcanized, and for their arrangement into the formation of bobbins of the said tapes.

2. Description of the Prior Art

More specifically, this invention concerns equipment for the industrial utilizations indicated, and able to constitute an element or unit of an entire plant for the manufacturing of pieces of hose, of great length, in natural or synthetic rubber, the plant being the subject of another contemporaneous application by the same applicant, to whose context reference is herein made, for the better understanding of some of the technical and industrial presuppositions of this same invention.

Moreover, the above indicated application of this invention does not constitute a limitation of the domain of the patent application, in that the invention subject here could find advantageous industrial uses in equivalent fields, for example, for the formation of vulcanizable rubber tapes, destined for diverse uses, for example, for the winding and the manufacture of shaped bodies of uniform diameter, and other.

SUMMARY OF THE INVENTION

The equipment of this invention is characterized by including, in general, a sequence of calandering means in which the amorphous mass of raw rubber, or anyway of vulcanizing elastomeric material, is reduced to the form of a tape, in particular of considerable length, means in which this tape undergoes progressive cooling, in order to give it the required consistency, means in which the surfaces of the said tape undergo treatment of a dosed application of zinc stearate, or other equivalent anti-adhesive product for raw rubber with a high covering capacity, before passing to the means which carry out the longitudinal cutting of the initial, wide continuous tape into two or more narrower tapes, suitable for the specific use of the article, and means for their winding into bobbins.

The means or stations for cooling are characterized, in their turn, mainly by comprising a large number of cooling cylinders; the tape is brought into contact with these, first one side and then the other adhering respectively to their surface, giving off heat, the said cylinders, as well as the intermediary rollers which make the advancing tape follow a predetermined course, including large circles or sectors of the said surfaces, having a cantilever support, by a carrying structure and including the driving gear of the cylinders, in such a way that the article being treated is accessible all the time, for its application (starting of the equipment) and for its handling, from one side of the equipment.

These and other specific characteristics of the equipment itself, together with the main industrial advantages which result from the application of the above described inventive concepts, will be better understood in the course of the following detailed description, related to the drawings:

BRIEF DESCRIPTION OF THE DRAWINGS

FIG. 1 represents, schematically and in side view, the complex of the essential components, in which this equipment constitutes the said operative element or unit;

FIG. 2 represents, in greater detail, an operative unit prepared in accordance with the invention, for the production of continuous tapes in raw rubber, either natural or synthetic;

FIG. 3 represents a variation in the putting together of the said unit, for the production of tapes by means of coating a fabric tape with a suitable mixture of rubber, or else by means of coupling a laminated or calendered rubber layer with fabric, and FIG. 4 represents a component of the continous cooling system of the tape, reproduced with some simplifications and constructive schematizations, a vertical section, for example, obtained in the plane and in the direction indicated with IV—IV in FIG. 2, the technical solution in FIG. 4 being valid also for the putting together of the unit or any of the cooling units of the equipment.

DESCRIPTION OF THE PREFERRED EMBODIMENTS

With particularly reference to the FIGURES of the drawing: as schematically indicated in FIG. 1, this equipment comprises a sequence of devices including a forming and calendering system 10 for the production of a wide tape of raw rubber, or of a mixture based on natural or synthetic rubber, which can be vulcanized, a cooling system 12 and, finally, a system 14 for the application of zinc stearate, or equivalent covering anti-adhesive material, in powder (more exactly, in splinters). These anti-adhesive products prevent the mutual adhesion between the superimposed coils of the bobbins in which the tape is packed, before it is applied (in the case foreseen by the invention, its winding around a mandrel or core, for the formation of rubber hose). These materials are chosen, based on technical knowledge, for their compatibility with raw rubber and their associability with it, during the vulcanizing treatment, as well as for their high covering capacity, which permit the formation of a very thin interlayer of anti-adhesive between the said coils, even though with proportionally very small quantities of the product.

As can be better observed in FIG. 2, system 10 preferably comprises two or preferably three calendering cylinders 10a, 10b and 10c. Cylinders 10a and 10b form a first couple through which the amorphous mixture of raw rubber 16, brought forward along presenting belt 18, is transformed into a rubber tape 20, which is then calendered and reduced to the necessary thickness around the second couple formed by the same cylinder 10b and the following cylinder 10c.

In the case of the production of "linenized" rubber tapes, or more exactly rubberized fabric tapes or tape coated and then coupled with a layer of rubber 20a, the forming system can be arranged as shown in FIG. 3. In this case the rubber tape 20, produced by calendering between cylinders 10a and 10b, is coupled, during its passage between cylinders 10b and 10c to a fabric 22, coming for example, from a bobbin or beam 24, so as to form a compound tape 20a to send to the cooling system, schematically reproduced and indicated as 12a, the whole as can be seen in FIG. 3, and in which the cooling is carried out by means of temporary contraposition of the rubberized surfaces of the said compound tape 20a, with cooling surfaces.

The cooling system 12 (or 12a) comprises at least one cooling cylinder, in general a number of cooling cylinders, each one indicated as 26 in FIGS. 2 and 3, around which the tape 20 (or 20a) follows a path, determined by the return rollers 28, including arcs as near as possible to 360° of contact with the surface of the said cylinders, before being sent, in direction A, to the said system 14.

These cooling cylinders 26, as well as the return rollers 28 are rotatively supported by a cantilever, as indicated in FIG. 4, by a supporting structure arranged on only one side of the battery of said cylinders and rollers. In this way, the advancing material is accessible at every point. This technical solution is very advantageous both for control and for any intervention necessary of the advancing material and also, mainly, for the starting of the machine, in the course of which this material can be inserted and positioned in the path desired.

As said above, the cooling cylinders 26 present a cylindrical surface of axial dimensions greater, with excess prudence, than the width of the tape 20 (or 20a) to be cooled. This surface is constituted by the perimetrical part 32 of a metallic drum (at least in the said perimetrical part) whose interval volume is largely occupied by an internal drum 34, of such a size as to form, together with the external drum, air spaces adjacent to both the said perimetrical part and to both the endwalls 36 and 38 of the external drum.

This double drum has a cantilever support by a hollow shaft 40, as shown in FIG. 4, with some constructive simplifications, rotatively supported by the said structure 30, by means of a pair of bearings suitably spaced to resist loads resulting from the cantilever support of the drum as well as stresses due to the presence and the advancement of the tape material 20 (or 20a).

The return rollers 28 are carried by pivots 42, also projecting and supported by structure 30, the cooling cylinders 26 are mechanically operated, by motor and transmission means whose driven end components are exemplified by a transmission chain 44 meshing with a toothed wheel 46, joined to the said shaft. All the cylinders of the complex 12 (or 12a) are operated with equal rim speeds (or better, with a rim velocity proportional to the diameter of the said cylinders) in such a way as to impose a constant traversing speed to the tape material 20 (or 20a). Furthermore, it is also possible to make the linear velocity of the advancing material different in various points of its path, for example to control elongation or other.

Moreover it is preferable that the cooling drums be operated by motors with varying speeds, or connected to moto-variators, in order to give the plant flexibility to adapt to different positions, in relation to the velocity of the tape material fed in and out of the molder system 10.

FIG. 4 also exemplifies the characteristic technical solutions preferred for the absorption and dissipation of the heat of the tape material 20 (or 20a). The cooling cylinder (or cylinders) 26 are cooled by means of circulation of a coolant, for example water, which is made to circulate in the said air spaces, through entry and exit ducts formed by the same shaft 40. This hollow shaft includes inside a second tubular shaft 48, in such a way that the said ducts are formed by the inside of this latter and respectively by the air space existing between it and the tubular shaft 40. As can be observed in FIG. 4, these ducts open, on the inside of the respective cooling cylinder 26, in correspondance of the air space adjacent to respectively one and to the other of the endwalls 36 and 38 of the external drum, in such a way that the circulating coolant is obliged to lap against the internal surface of the said perimetrical part 32, in a material which conducts heat well, of the cooling cylinder, absorbing heat from every point of this perimetrical part, in contact with the tape material.

Given however, that this equipment has been described and represented as a purely indicative but not limitative example, it is evident that numerous variations and modifications could be adapted in the constructive details and/or in the number of its different components, according to the specific constructions, installation and service requirements, the whole not leaving the range of the invention. Similarly, the equipment could be completed with suitable command and control devices, in particular with thermostatic means for regulating the temperature of the coolant, tensiometers for controlling the tension of the advancing tape material, these means piloting, by means of known preferred systems connected to central command box, the feeding of the coolant and respectively the velocities of the driving motors and/or variators and so forth.

I claim:

1. In apparatus for the production of continuous tape of vulcanizable elastomeric material, in combination:
   (i) at least one pair of counter-rotatable rollers coacting to serve as a calender
   (ii) means for feeding vulcanizable elastomeric material to said calender for the production of a tape
   (iii) a cooling assembly to receive said tape from the calender, said cooling assembly including:
   (a) a plurality of cooling cylinders each having a cylindrical outer wall and first and second axial end walls, said first end wall having an axial opening, an internal wall spaced from and connected to said outer wall and said end walls and defining therewith a chamber to receive coolant fluid, inner and outer radially-spaced concentric hollow shafts coupled for rotation in unison, said inner shaft having said internal wall secured thereon, said outer hollow shaft being connected to said first end wall about said axial opening, said inner hollow shaft extending into said cylinder and through said internal wall and opening adjacent said second end wall, whereby a continuous flow path for coolant fluid is established between said inner and outer hollow shafts over the whole internal surface of said cylinder, and
   (b) a respective pair of guide rollers disposed adjacent the cylindrical outer wall, said guide rollers being closely spaced angularly with respect to an axis of rotation of the cylinders such that tape material may be passed about said guide rollers and about a major part of each cylindrical outer wall.

2. Apparatus, as claimed in claim 1, further comprising:
   (i) a supporting structure including means serving as a journal for said outer concentric shaft, said guide rollers being rotatably mounted on said structure
   (ii) a sprocket secured on said outer concentric shaft, and
   (iii) a chain engaged with said sprocket for driving said cooling cylinder in rotation.

3. Apparatus, as claimed in claim 1, wherein there are provided at least three cooling cylinders each having a respective pair of guide rollers associated therewith, said apparatus further including a supporting structure including means serving as a journal for said outer concentric shaft such that each cooling cylinder is supported from one axial end only, said guide rollers being rotatably supported at one axial end only from said supporting structure, whereby all of the cylinders and guide rollers are freely accessible at their other axial end to facilitate fitting of the tape about said cylinders and rollers.

* * * * *